Patented July 23, 1946

2,404,392

UNITED STATES PATENT OFFICE 2,404,392

SYNTHETIC RUBBER AND PROCESS OF ITS MANUFACTURE

Alessandro Maximoff, Milan, Italy; vested in the Alien Property Custodian

No Drawing. Application July 16, 1938, Serial No. 219,604. In Italy July 19, 1937

1 Claim. (Cl. 260—86)

This invention relates to a process for the manufacture of valuable rubber like masses.

In accordance with the present invention butadiene or its homologues are polymerised with hydrocarbons of the general formula:

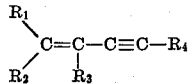

wherein $R_1$, $R_2$, $R_3$, $R_4$ are either hydrogen-atoms or any organic hydrocarbon radicals.

Such hydrocarbons may be polymerised in admixture with butadiene and/or its homologues thus yielding polymers of better mechanical properties than pure butadiene polymerizates.

The polymerization of a mixture of the said hydrocarbons with butadiene may be effected according to any of the following methods:

1. Polymerization by the action of the usual catalysts, without solvents.
2. Polymerization in the solution state, using as solvents ketones, alcohols or hydrocarbons which latter must be stable to polymerization, such as benzene or gasoline.
3. Polymerization in the emulsified state.

From a technological standpoint this latter is the best method.

Hydrocarbons corresponding to the general formula

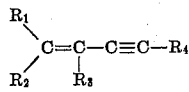

may be added to butadiene in any desired proportion, but the best results were obtained within a range between 20 and 150% by weight of butadiene or its homologues.

The following examples will further illustrate the nature of this invention.

Example 1

To 160 parts of water there are added:
    40 parts of a 10% ammonia solution
    2 parts of a 30% hydrogen peroxide solution A second solution, containing:
    100 parts of butadiene
    35 parts of vinyl acetylene
    10 parts of oleic acid is introduced under suitable pressure into the first solution thus forming a dispersion or artificial latex, and the mixture is polymerized at 50–60° C. for about 72 hours, under continuous shaking.

The dispersion is then cooled to normal temperature, and the non-polymerized hydrocarbons are distilled off: the remaining latex is coagulated by addition of acetic acid, and the rubber coagulum is washed with water in a rubber mill and finally an amount of 2–3% of an antioxidizing agent such as phenyl-beta-naphthylamine is incorporated therein.

Example 2

8 parts of acetic acid
    1 part of trichloroacetic-acid and
    1.5 parts of benzoyl peroxide are dissolved into 200 parts of water.

A second solution, prepared by adding to:
    100 parts of butadiene
    50 parts of monophenyl-vinyl-acetylene and
    10 parts of saponin is introduced under suitable pressure into the first solution, thus forming a dispersion or artificial latex, and the mixture is polymerized at 40° C. for 3 to 5 days under continuous shaking.

The resilient polymerization product is obtained by coagulation of the emulsion with acetone or with a sodium chloride solution. The coagulum is washed with water and a preserving agent is incorporated therein.

Example 3

To 200 parts of water there are added:
    5 parts of casein
    8 parts of the sodium salt of the butyl-naphthalene-sulphonic acid
    3 parts of a 30% solution of hydrogen peroxide A second solution prepared by adding to:
    100 parts of butadiene,
    60 parts of monomethyl vinyl acetylene is introduced into the first solution, and the mixture is polymerized as in the preceding examples.

The above examples have been reported to illustrate how the present invention is to be carried out in practice, but the invention is not restricted to these examples, as other acetylene homologues as well as other emulsifying substances or other catalysts may be usefully employed.

What I claim is:

A process for the manufacture of synthetic rubber by polymerisation of butadiene 1.3 hydrocarbon, wherein said hydrocarbon is polymerised in admixture with vinylacetylene the same constituents being in an emulsion form during polymerization.

ALESSANDRO MAXIMOFF.